(12) United States Patent
Hellebust et al.

(10) Patent No.: US 7,511,603 B2
(45) Date of Patent: Mar. 31, 2009

(54) FILTERED IN-BOX FOR VOICE MAIL, E-MAIL, PAGES, WEB-BASED INFORMATION, AND FAXES

(75) Inventors: Kent A. Hellebust, Woodinville, WA (US); Thomas J. Trinneer, Woodinville, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

(21) Appl. No.: 10/644,641

(22) Filed: Aug. 19, 2003

(65) Prior Publication Data

US 2005/0248437 A1 Nov. 10, 2005

Related U.S. Application Data

(63) Continuation of application No. 09/386,762, filed on Aug. 31, 1999, now Pat. No. 6,628,194.

(51) Int. Cl.
*G08B 5/22* (2006.01)
*H04Q 1/30* (2006.01)

(52) U.S. Cl. .............. 340/7.5; 340/7.51; 340/7.6; 340/7.21; 340/7.3; 455/458

(58) Field of Classification Search ............ 340/7.5, 340/7.51–7.59, 7.6; 455/458, 38.1, 33.3, 455/426; 345/329, 340, 326; 395/650
See application file for complete search history.

(56) References Cited

U.S. PATENT DOCUMENTS

| 4,837,798 | A |   | 6/1989  | Cohen et al. |
| 5,377,354 | A | * | 12/1994 | Scannell et al. ............ 718/103 |
| 5,559,860 | A |   | 9/1996  | Mizikovsky |
| 5,579,472 | A | * | 11/1996 | Keyworth et al. ........... 715/751 |
| 5,627,764 | A |   | 5/1997  | Schutzman et al. |
| 5,673,322 | A |   | 9/1997  | Pepe et al. |
| 5,705,995 | A | * | 1/1998  | Laflin et al. ................ 340/7.48 |
| 5,784,001 | A | * | 7/1998  | Deluca et al. ............. 340/7.56 |
| 5,796,394 | A | * | 8/1998  | Wicks et al. ................ 715/751 |
| 5,797,103 | A |   | 8/1998  | Duda |
| 5,815,800 | A | * | 9/1998  | Su et al. .................... 340/7.22 |
| 6,061,570 | A | * | 5/2000  | Janow ........................ 455/458 |
| 6,072,867 | A | * | 6/2000  | Lieuwen ................ 379/220.01 |
| 6,075,984 | A | * | 6/2000  | Murata ....................... 455/415 |
| 6,141,686 | A |   | 10/2000 | Jackowski et al. |
| 6,157,630 | A | * | 12/2000 | Adler et al. ................. 370/338 |
| 6,212,550 | B1 | * | 4/2001 | Segur ......................... 709/206 |
| 6,263,064 | B1 |   | 7/2001 | O'Neal et al. |
| 6,463,145 | B1 | * | 10/2002 | O'Neal et al. .......... 379/211.02 |

* cited by examiner

*Primary Examiner*—Brian A Zimmerman
*Assistant Examiner*—Nam V Nguyen
(74) *Attorney, Agent, or Firm*—Michael J. Donohue; Davis Wright Tremaine LLP

(57) ABSTRACT

The present invention is directed to a system for displaying, organizing, and prioritizing the incoming information on a wireless device. Using the present invention the wireless device can display the number of voice mails, e-mails, pages, and Internet information alerts that have been received by the wireless device during a specified time period. The invention also allows the incoming information to be separated by any number of user-specified criteria such as the originating sender, or divided by work related and personal messages. The present invention allows the wireless device user to see at a glance what kind of information has been received and is being stored on the wireless device.

23 Claims, 3 Drawing Sheets

FILTERED IN-BOX FOR VOICE MAIL, E-MAIL, PAGES, WEB-BASED INFORMATION, AND FAXES

CROSS REFERENCE TO RELATED APPLICATIONS

This is a continuation of U.S. patent application Ser. No. 09/386,762, filed Aug. 31, 1999, now U.S. Pat. No. 6,628,194, which is incorporated herein by reference.

FIELD OF THE INVENTION

The present invention is directed to a method for organizing, prioritizing, and displaying incoming message information on a wireless device.

BACKGROUND OF THE INVENTION

In recent years, the functionality of wireless devices has expanded far beyond simple voice or pager communications. Wireless devices can now receive a variety of incoming messages including pages, e-mails, faxes, voicemails, and short message services such as weather or sports updates. In some cases the actual message, for example a voicemail, is not delivered directly to the wireless device due to memory, bandwidth, or other limitations, but rather a notification message is sent to the wireless device to notify the user that a message has arrived and is being stored at a remote location. These type of notification messages are known in the art as shown in U.S. Pat. No. 5,797,103, "Method and Apparatus For Informing A Remote Unit Of A Feature-Originated Call", incorporated herein by reference. The notification messages, as well as some actual messages, are generally stored within the wireless device. However, most wireless devices are only equipped with a small screen that displays a few short lines of text or small graphics. To view each item that has been sent to the wireless device, the user generally must scroll through a series of screens or menus and may be forced to examine all of the items of a particular type, or sometimes all of the items regardless of type in order to find the message of interest. Most wireless devices can be set to alert the user that a new message has arrived, but this feature is not very useful if it is alerting the user every few moments that something new has arrived. The user is likely to begin ignoring the alert or simply turn it off. This may result in important messages going unnoticed among a large number of unimportant messages.

For example, a user may subscribe to a number of services for his wireless device, including paging, a sports score service, and e-mail. With all these services active on a typical evening when a variety of sporting events are in progress, the user may be receiving several messages every few minutes. If during this time the user receives an important page or e-mail from his or her boss, the message may go unnoticed among all the other messages, and the user may miss an important work assignment.

The user of a wireless device can be easily overwhelmed when trying to keep track of and prioritize the myriad pieces of information that are arriving at any given time. It would be desirable for the wireless device to be able to organize the incoming information in such a way that the user can quickly and easily recognize and distinguish between important and unimportant items.

SUMMARY OF THE INVENTION

The present invention provides a method for automatically organizing and prioritizing the incoming messages on a wireless communication device and displaying the messages accordingly. A predetermined set of rules is used to perform the organization and prioritization of the incoming messages. When a message arrives, it is analyzed to determine certain classification information about the message. This classification information is then used to organize the incoming message among the messages that are already being stored on or referenced on the wireless device. This information is also used to determine the priority of the incoming message. Depending on the level of priority assigned to the incoming message, the wireless device may alert the user that the new message has arrived or may just store the message for the next time the user chooses to check for messages. The wireless device may also update its display to reflect the various classification information that has been gathered about the messages presently being stored.

The present invention allows the user of a wireless communication device to subscribe to any number of services that send messages to the device, but the user maintains control over the way the incoming messages are handled to prevent being overwhelmed with information.

DETAILED DESCRIPTION

Figure 1:
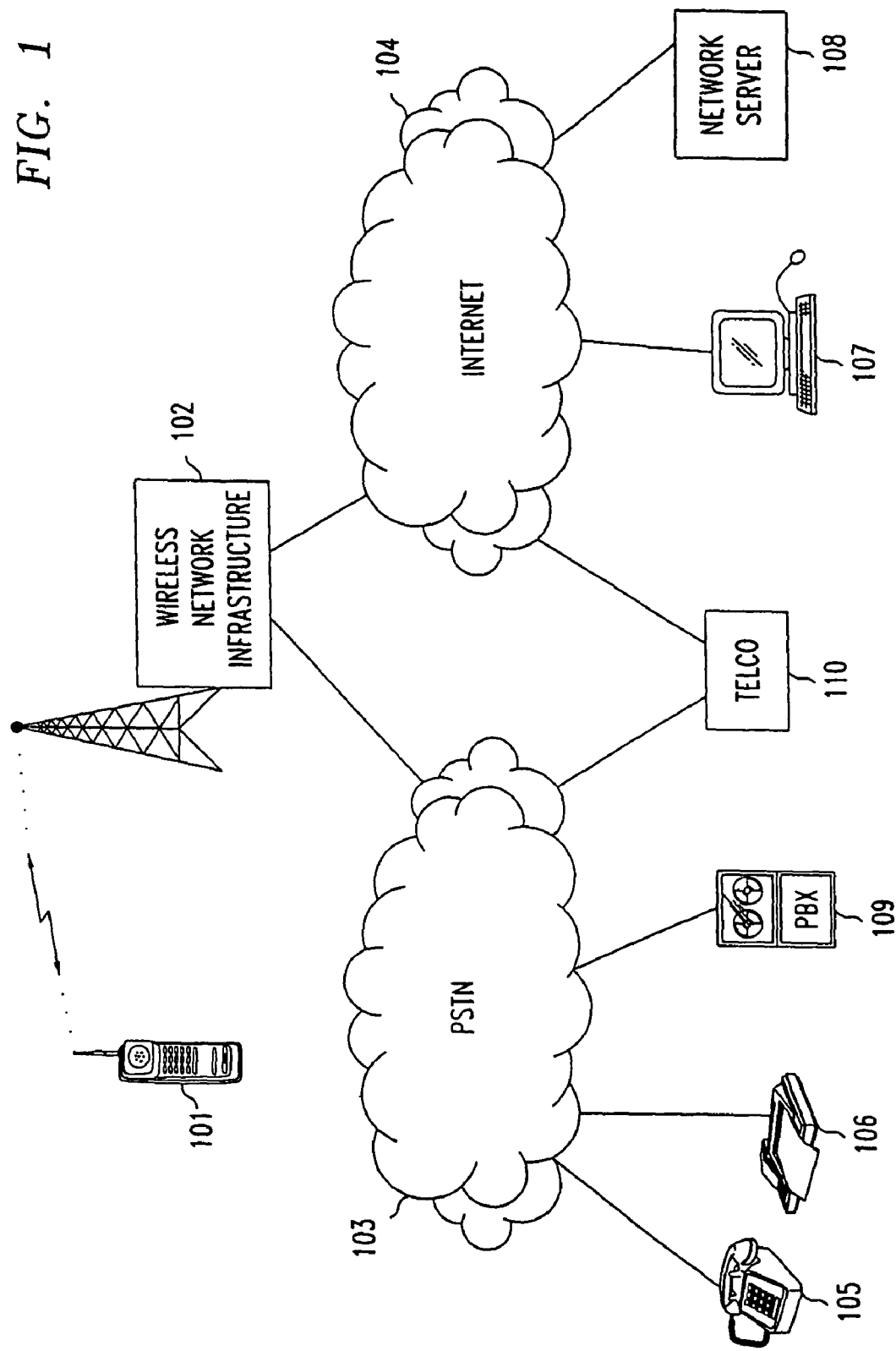
FIG. 1 illustrates a wireless network such as may be used with an embodiment of the present invention.

The present invention could be implemented within a wireless network similar to that depicted in FIG. 1. A wireless device 101 communicates with a wireless infrastructure 102 that is connected to a variety of public and private networks including the Public Switched Telephone Network (PSTN) 103 and the Internet 104. The user of the wireless device subscribes to a variety of information services that send messages of various formats or types to the wireless device via one of the networks to which wireless infrastructure 102 is connected. These services can include, but are not limited to, email, paging, voice mail, fax, and short-message services (including short-message-based information services). These messages can originate from a variety of equipment such as telephone 105, fax machine 106, computer terminal 107, or network service 108, depending on the type of message. The equipment that sends the message will vary based on the type of message, and some messages may pass through more than one type of equipment before delivery to the wireless device. For example, an individual may leave a voicemail message for the user of the wireless device from telephone 105, but the voicemail will likely be stored on Private Branch Exchange (PBX) equipment 109 or telephone company equipment 110. The device storing the voicemail will send a notification message to the wireless device to inform the user that the voicemail has arrived. Additionally, some types of messages can be sent from more than one type of equipment. For example, faxes may be sent from either fax machine 106 or computer terminal 107 if it is equipped with fax software.

Figure 2:
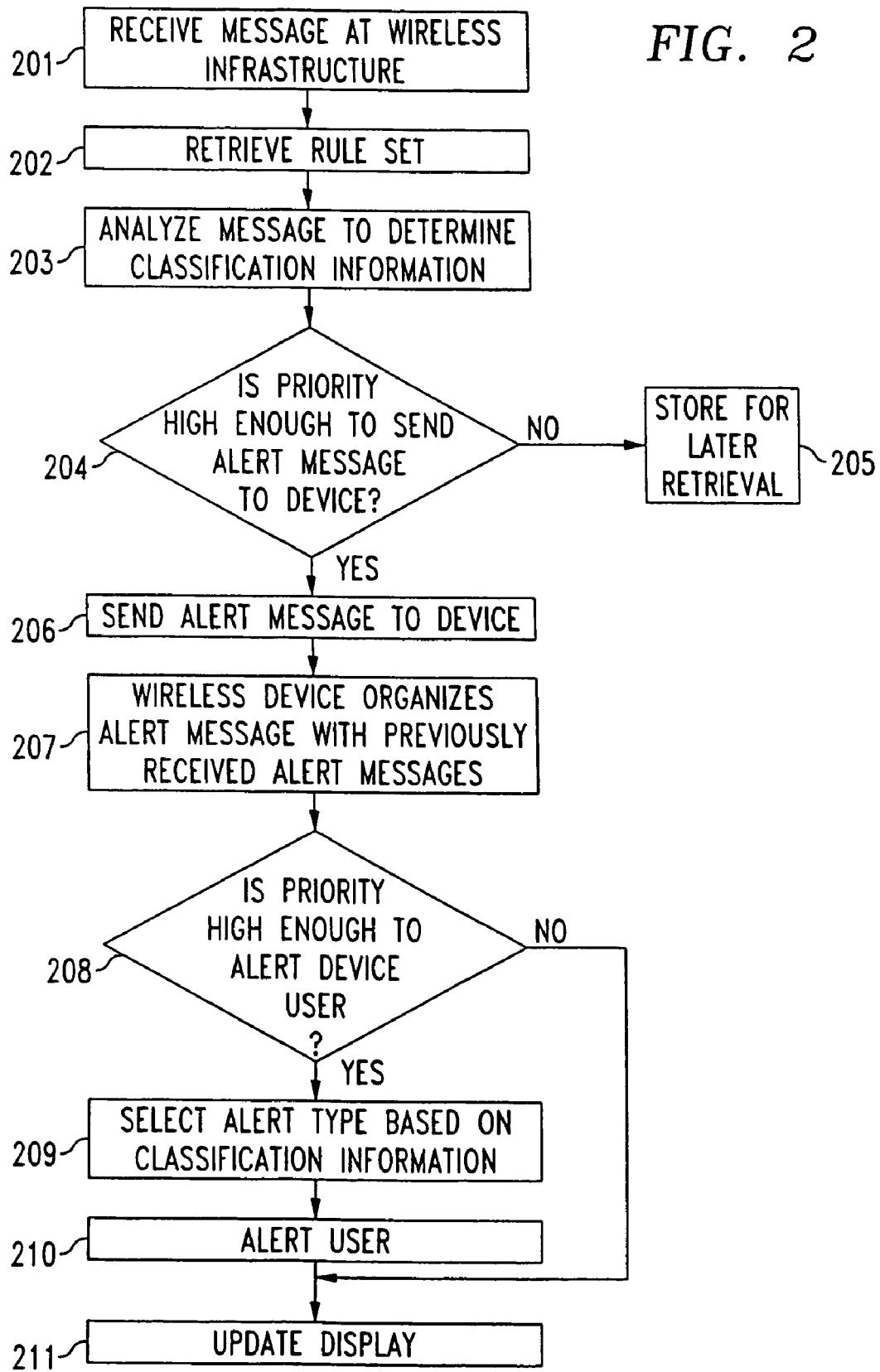
FIG. 2 is a flowchart illustrating one possible implementation of the method of the present invention.

FIG. 2 illustrates one possible way of implementing the present invention, where much of the processing of the incoming messages is performed in the wireless infrastructure. A message for the user of wireless device 101 is received by wireless infrastructure 102 (step 201). The wireless infrastructure then retrieves a set of rules, corresponding to the user for which the message is intended, from a database either co-located with the wireless infrastructure or at a remote location that is accessible to the wireless infrastructure via a computer network (step 202). Using these rules, the wireless infrastructure analyzes the message and determines classification information about the message (step 203). Based on this classification information, the wireless infrastructure can assign a priority to the message if desired. If this priority is not very high the wireless infrastructure may elect not to send the alert message to the device, instead saving the alert message for later retrieval (step 204, 205). If the priority is sufficiently high, the wireless infrastructure sends to the wireless device an alert message containing the classification information about the received message (step 206). This alert message can optionally contain part or the entire contents of the original message along with the classification information. Once the wireless device receives the alert message, the wireless device organizes and prioritizes the incoming message with the messages already stored on the wireless device using the classification information and pre-assigned priority information (if available) associated with the incoming message and using the classification information that was previously determined for and associated with each of the stored messages (step 207). The wireless device then checks to see if the incoming message has been designated of a sufficient priority level to alert the user of the wireless device that the message has arrived (step 208). If so, the wireless device can select a customizable or user-defined alert type such as ringing, beeping, or vibrating, based on the classification information (step 209). The wireless device alerts the user using the selected method (step 210). The display of the wireless device may also be updated to reflect that a new message has arrived, such as by the display of standard or user-defined icons or sounds, the display of summarized message counts by type, or the display of the actual message itself as determined by the message priority and user-defined settings (step 211).

The method of the present invention as illustrated in FIG. 2 could also be implemented in another device on the network to which the wireless infrastructure could route the incoming messages for processing before passing them on to the wireless device.

Figure 3:
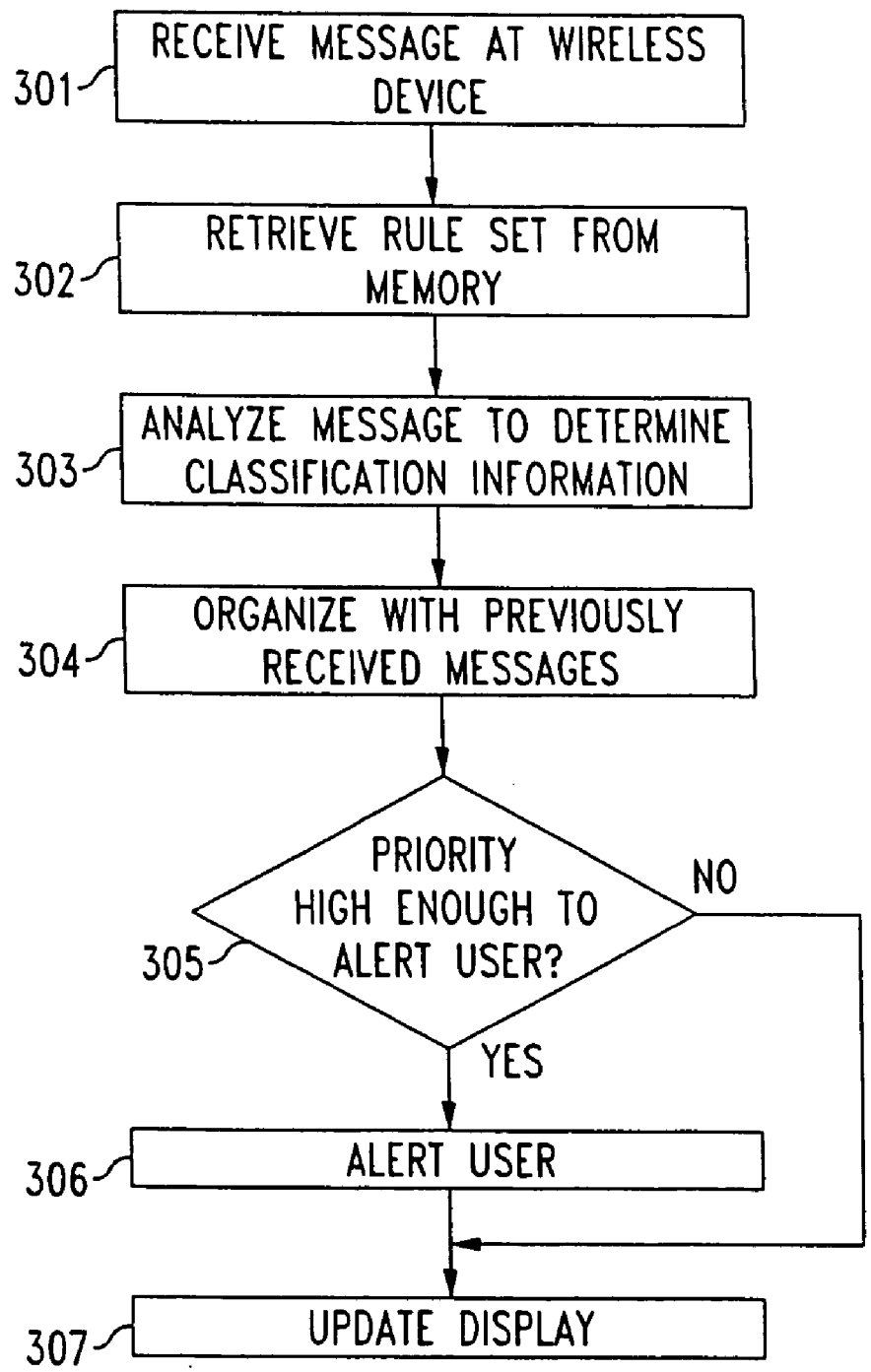
FIG. 3 is a flowchart illustrating an alternative implementation of the method of the present invention.

Alternatively, all of the processing could be done on the wireless device itself as illustrated by the flowchart in FIG. 3. The wireless device receives an incoming message from the wireless infrastructure (step 301). The wireless device then retrieves a predetermined set of rules corresponding to the user of the wireless device from its own memory or alternatively from a database somewhere else in the network (step 302). The incoming message is then analyzed using the predetermined set of rules to determine classification information (step 303). Using this classification information, the wireless device organizes the incoming message with the messages already stored on the wireless device (step 304). The wireless device also employs the predetermined rules to determine whether the incoming message is of sufficient priority to alert the user that it has arrived (step 305). If it is of sufficient priority, then the wireless device alerts the user using well known methods (step 306). In either case, the wireless device updates its display to reflect the incoming message (step 307).

The rule sets of the present invention used to determine the classification information are typically predetermined by the user of the wireless device. The user can input and modify these rules using any of a variety of well-known systems, including calling into an interactive voice-response system or a system that responds to touch-tone key presses, using software carried on the wireless device itself, or using a computer interface via the Internet or World Wide Web. These rules could be very simple in nature, with the user's choices being limited to a few very general rules based on a few criteria, for example, message type or message origin. Alternatively, the user could be given the option of creating sophisticated rules that would allow the incoming messages to be searched for key words or phrases, or that would use different rules depending on time of day, day of the week, source of message, etc. The present invention could also be implemented with nested categories. For example, all email messages could be grouped under an "email" category, and within that category the email messages could be grouped again as "work" or "personal" email.

For example, one potential rule would analyze an incoming email message and extract the email address of the originator. This address could then be cross-referenced with a built-in address book on the wireless device to locate the category that the individual corresponding to the email address has been classified under in the address book. The email message could then be classified under the same category.

The kind of classification information that can be obtained from the incoming message will vary based on the type or format of the message, but typical information may include type, origin, time received, and size. Certain message formats, such as email, can provide further information including, for example, full text searching of the content of the message. More sophisticated systems could be implemented to search voicemail messages for keywords through the use of voice recognition technology. Those of skill in the art will easily be able to determine additional kinds of information that can be extracted from incoming messages for use as classification information based on the type of message.

The display of the wireless device can be updated to inform the user of the results of the classification, organization, and prioritization steps in a variety of ways. The display of the wireless device could show the number of messages under each of the categories defined by the rule sets. Alternatively, the display could organize the messages by priority level, time received, or any other externally defined or user-defined item of classification information.

The method of the present invention can be implemented using any well known programming language and techniques. The implementation on the wireless device may be particularly suited to using Wireless Application Protocol (WAP) Forum defined standards, such as Wireless Markup Language (WML). The use of rule sets to organize messages is well known in the field of email software. Products like Microsoft Outlook 97 employ rules to direct incoming email messages to particular folders within the user's email box. Those of skill in the art will recognize how to implement the rule sets of the present invention to function in a similar fashion but without being limited to any one type of message.

The present invention is not limited to the specific embodiments described. It is expected that those skilled in the art will be able to devise other implementations that embody the principles of the present invention and remain within its scope.

What is claimed is:

1. A mobile wireless communication device configured to communicate with a wireless infrastructure, comprising:
   a receiver configured to receive a plurality of messages of a first format and a plurality of messages of a second format, wherein the receiver is configured to receive the plurality of messages from a base station in the wireless infrastructure;
   the receiver configured to receive at least one message-classification rule from a database memory, wherein the database memory is associated with the wireless infrastructure at a location separate from the wireless device, wherein the message-classification rule being at least for prioritizing the messages;

a processor connected to the receiver, the processor being configured to determine, based on the at least one message-classification rule, classification information for the plurality of messages of the first format and the plurality of messages of the second format, the classification information including at least a prioritization of the messages; and a display connected to the processor and configured to present the classification information associated with the messages of the first format and of the second format.

2. The wireless communication device of claim 1, wherein the processor is configured to produce updated classification information, and the display is configured to present the updated classification information.

3. The wireless communication device of claim 1, wherein the receiver is configured to receive classification information associated with messages from the plurality of messages of the first format and the plurality of messages of the second format, and the display is configured to display a number of messages of the first format or a number of messages of the second format.

4. The wireless communication device of claim 1, wherein the classification information includes information about an origin of at least one received message.

5. The wireless communication device of claim 1, wherein the receiver is configured to receive a plurality of messages of a third format.

6. The wireless communication device of claim 1, where the first format is a voice mail format.

7. The wireless communication device of claim 1, wherein the first format is a fax format.

8. The wireless communication device of claim 1, wherein the first format is an e-mail format.

9. The wireless communication device of claim 1, wherein the first format is a paging format.

10. The wireless communication device of claim 1, wherein the first format is a short message service format.

11. The wireless communication device of claim 1, wherein the first format is based on a Wireless Markup Language.

12. The wireless communication device of claim 1, wherein the memory is further configured to receive the at least one message rule by the user calling into an interactive voice-response system.

13. The wireless communication device of claim 1, wherein the memory is further configured to receive the at least one message rule by the user performing touch-tone key presses.

14. The wireless communication device of claim 1, wherein the memory is further configured to receive the at least one message rule by the user using a computer interface via the Internet or World Wide Web.

15. The wireless communication device of claim 1, wherein the at least one message rule facilitates searching of messages, incoming into the wireless communication device, for key words or phrases.

16. The wireless communication device of claim 1, wherein the at least one message rule facilitates classification of messages, incoming into the wireless communication device, based on one or more of type of message, size of message, time of day at which message is received, week day on which message is received, and source of message.

17. The wireless communication device of claim 1, wherein the at least one message rule facilitates grouping of messages, incoming into the wireless communication device, based on a nested category.

18. A mobile wireless device for communicating with a wireless infrastructure, comprising:

a receiver configured to receive messages of at least two types for a wireless network user who is using the network device, wherein the receiver is configured to receive the messages from a base station in the wireless infrastructure;

the receiver configured to receive at least one message-classification rule from a database memory, wherein the database memory is associated with the wireless infrastructure at a location separate from the wireless device, wherein the message-classification rule being at least for prioritizing the messages; and a processor connected to the receiver, the processor being configured to evaluate the received messages based on the at least one rule set and to produce associated message classifications based on the evaluations.

19. The mobile wireless device of claim 18, wherein the processor is configured to produce an updated message count associated with numbers of messages associated with the message classifications.

20. A mobile wireless device in wireless communication with a wireless infrastructure, the wireless device comprising:

a receiver configured to receive messages of at least one format from the wireless infrastructure and to provide the messages to a user of the wireless device, wherein the receiver is configured to receive the plurality of messages from a base station in the wireless infrastructure;

an input device configured to be used by the user of the wireless device for inputting, into a database memory, at least one message-classification rule for at least prioritizing the messages, wherein the database memory is associated with the wireless infrastructure at a location separate from the wireless device;

a processor connected to the receiver and to the input device, the processor being configured to recall the at least one message-classification rule from the database memory and to determine, based on the at least one message-classification rule, classification information pertaining to the message; and a display connected to the processor and configured to present the classification information to the user of the wireless device.

21. The wireless device of claim 20, further comprising a message memory connected to the processor, wherein the processor stores, in the message memory, incoming messages organized according to the respective classification information determined by the processor for the messages.

22. The wireless device of claim 20, wherein the processor is further configured to:

update the display to reflect receipt of the message, determine, based on the classification information determined for the received message and according to the at least one message-classification rule, whether the received message is of sufficient priority, and if the message is of sufficient priority, alert the user.

23. A wireless device in wireless communication with a wireless infrastructure, the wireless device comprising:

a receiver configured to receive messages of at least one format from the wireless infrastructure and to provide the messages to a user of the wireless device;

an input device configured to be used by the user of the wireless device for inputting, into a database memory, at least one message-classification rule for at least prioritizing the messages, wherein the database memory is associated with the wireless infrastructure at a location separate from the wireless device;

a processor connected to the receiver and to the input device, the processor being configured, with respect to a message received by the receiver, (a) to recall the at least one message-classification rule from the database memory and to determine, based on the at least one message-classification rule, classification information pertaining to the message, and (b) to organize the message according to the classification information; and a display connected to the processor and configured to present the classification information to the user of the wireless device.

* * * * *